US007207394B2

(12) United States Patent
Young et al.

(10) Patent No.: US 7,207,394 B2
(45) Date of Patent: Apr. 24, 2007

(54) INTERMEDIATE AND ASSEMBLY ASSISTANCE COMPONENTS FOR FLUID DRIVEN TOOLS AND TOOLS INCORPORATING THE SAME

(75) Inventors: James R. Young, Randolph, NJ (US); Douglas E. Pyles, Bethlehem, PA (US); Michael A. Youhouse, Davidson, NC (US); Brian R. Roache, Paramus, NJ (US)

(73) Assignee: Ingersoll-Rand Company, Montvale, NJ (US)

( * ) Notice: Subject to any disclaimer, the term of this patent is extended or adjusted under 35 U.S.C. 154(b) by 0 days.

(21) Appl. No.: 10/923,378

(22) Filed: Aug. 20, 2004

(65) Prior Publication Data

US 2006/0040599 A1 Feb. 23, 2006

(51) Int. Cl.
*E21B 3/00* (2006.01)
*F16K 27/04* (2006.01)

(52) U.S. Cl. .................... 173/218; 173/93.5; 173/168; 173/169; 173/47

(58) Field of Classification Search ............... 173/93.5, 173/218, 219, 221, 168, 169, 170; 137/270; 251/118
See application file for complete search history.

(56) References Cited

U.S. PATENT DOCUMENTS

| | | | | |
|---|---|---|---|---|
| 1,862,223 | A | 6/1932 | King | |
| 2,099,280 | A | 11/1937 | Shaff | |
| 2,514,914 | A | 7/1950 | Van Sittert | |
| 2,543,979 | A | 3/1951 | Maurer | |
| 3,097,571 | A | 7/1963 | Kaman | |
| 4,236,589 | A | 12/1980 | Griffith | |
| 4,496,023 | A | 1/1985 | Lindberg et al. | |
| 4,905,772 | A | 3/1990 | Honsa et al. | |
| 4,962,787 | A | 10/1990 | Mayhew | |
| 5,110,030 | A | 5/1992 | Tanji | |
| 5,309,714 | A * | 5/1994 | Putney et al. | 60/407 |
| 5,377,769 | A | 1/1995 | Hasuo et al. | |
| 5,591,070 | A | 1/1997 | Kachich | |
| D408,243 | S * | 4/1999 | Izumisawa | D8/61 |
| 5,992,540 | A | 11/1999 | Smolinski et al. | |
| 6,044,917 | A | 4/2000 | Brunhoelzl | |
| 6,062,323 | A | 5/2000 | Pusateri et al. | |
| 6,158,528 | A | 12/2000 | Izumisawa | |
| 6,192,781 | B1 * | 2/2001 | Thames et al. | 91/30 |
| 6,401,836 | B1 * | 6/2002 | Heinrichs et al. | 173/93 |
| 6,530,436 | B2 | 3/2003 | Nowak, Jr. et al. | |
| 6,568,483 | B2 | 5/2003 | McCallops et al. | |
| 6,585,060 | B1 * | 7/2003 | Iritani | 173/169 |
| 6,634,438 | B1 * | 10/2003 | Pusateri et al. | 173/1 |
| 6,668,942 | B1 * | 12/2003 | Lin | 173/211 |
| 6,805,272 | B1 * | 10/2004 | Sen-Mu et al. | 227/130 |
| 6,880,645 | B2 * | 4/2005 | Izumisawa | 173/93.5 |
| 2003/0047333 | A1 | 3/2003 | Izumisawa | |
| 2004/0216907 | A1 * | 11/2004 | Happ et al. | 173/217 |

* cited by examiner

*Primary Examiner*—Brian Nash

(57) ABSTRACT

A flow guide configured for insertion in a cavity defined between an outer housing and a nested inner motor housing of a fluid driven tool. The flow guide defines a longitudinal axis and includes at least two longitudinal portions disposed parallel to the longitudinal axis and defining a longitudinal channel therebetween, and a rib being substantially circumferential and connecting the longitudinal portions at points defining a plane substantially transverse to the longitudinal axis. The rib defines a recess that permits fluid communication in the longitudinal channel across the rib.

27 Claims, 21 Drawing Sheets

INTERMEDIATE AND ASSEMBLY ASSISTANCE COMPONENTS FOR FLUID DRIVEN TOOLS AND TOOLS INCORPORATING THE SAME

BACKGROUND OF THE INVENTION

The present invention relates to pneumatically driven apparatus and, in particular, to pneumatically driven hand tools, construction methods, and the channeling of air through these tools.

Pneumatic hand tools, such as air grinders, are well known. Typically, these hand tools have an elongated housing with a handle portion at one end and a collet or arbor for mounting various types of abrasive media at the other end. An air motor is typically disposed in the housing intermediate the ends for driving the arbor, the air motor being coupled to a source of pressurized air through a fluid inlet which commonly extends axially through the handle portion. The housing may be provided with a trigger, which may be in the form of a lever alongside the outside of the housing or a radially projecting button, adapted to be operated by a finger or fingers of the user's hand which grasps the handle, for operating an internal valve to admit air to the air motor.

In prior air tools, various types of exhaust arrangements have been utilized. In one arrangement the air is exhausted from a forward portion of the housing to clean the working area, for example. Commonly, the air exits the air motor into a circumferential passage or chamber, which may contain a muffler arrangement and communicates with an exit opening at a forward portion of the housing. Alternatively, rear-exhaust arrangements have also been utilized, which include an exhaust passage, which passes back through the handle portion, generally parallel to the inlet passage.

To provide these different exhaust arrangements, some conventional tools use a reversing valve mechanism to reverse the flow of exhaust fluid, which increases both complexity of construction and cost. Other known tools are constructed solely for front exhaust or rear exhaust, which require the manufacture of different parts for conversion between alternate exhaust configurations. In addition to reversing exhaust air direction, it is desirable to vary motive fluid flow through a motor construction to obtain different motor speeds for the same motor construction. Typically this can be done by sizing and shaping an orifice in the fluid flow path to restrict fluid flow to a predetermined mass rate of flow, thus limiting motor speed. This speed regulation can be accomplished with a variable regulating valve or, alternatively, with many single use permanent parts. Variable regulating valves typically are complex and subject to wear while single use permanent parts reduce the flexibility of converting the tool and create logistical problems in manufacturing the various parts. Both alternatives are typically costly to construct.

The construction of these pneumatic hand tools is typically accomplished by assembling components into an outer housing made of a thermoplastic such as an injection molded nylon or other plastic material. During assembly, these materials can be subject to breakage due to excessive holding forces that can be caused by holding the housing in a vise or other jig configuration.

The foregoing illustrates limitations known to exist in present pneumatic devices. Thus it is apparent that it would be advantageous to provide an alternative directed to overcoming one or more of the limitations set forth above. Accordingly an alternative assembly construction, pneumatic flow guide and apparatus incorporating the same are provided including the features more fully disclosed hereinafter.

SUMMARY OF THE INVENTION

According to the present invention, a flow guide configured for insertion in a cavity defined between an outer housing and a nested inner motor housing of a fluid driven tool and a tool incorporating the same are provided. The flow guide has a longitudinal axis and includes at least two longitudinal portions disposed parallel to the longitudinal axis and defining longitudinal channel therebetween. At least one substantially circumferential rib portion connects the at least two longitudinal portions at points defining a plane substantially transverse to the longitudinal axis. A portion of the at least one rib portion located in the longitudinal channel has a thickness less than a width of the cavity surrounding the rib to define a circumferential recess that permits fluid communication in the longitudinal channel across the at least one rib.

Also provided is a fluid driven tool having an outer housing and an inner motor housing nested in the outer housing and defining a cavity therebetween. The cavity has a first end with a first exhaust passageway and a second end with a second exhaust passageway. The inner motor housing has a motor chamber with at least one inlet port for a fluid driven motor and a fluid inlet, and an inlet manifold disposed in the cavity. The inlet manifold has a recessed portion with a surrounding seal configured to engage the inner motor housing and connect the fluid inlet to the at least one inlet port of the inner motor housing.

Also provided is a fluid driven tool having an outer housing and an inner motor housing nested in the outer housing. An inner surface of the outer housing and an outer surface of the inner motor housing have portions that mate upon nesting the inner motor housing in the outer housing and provide reinforced areas for clamping regions of the outer housing located over the reinforced areas.

The foregoing and other aspects will become apparent from the following detailed description of the invention when considered in conjunction with accompanying drawing figures.

BRIEF DESCRIPTION OF THE DRAWING FIGURES

DETAILED DESCRIPTION

Figure 1:
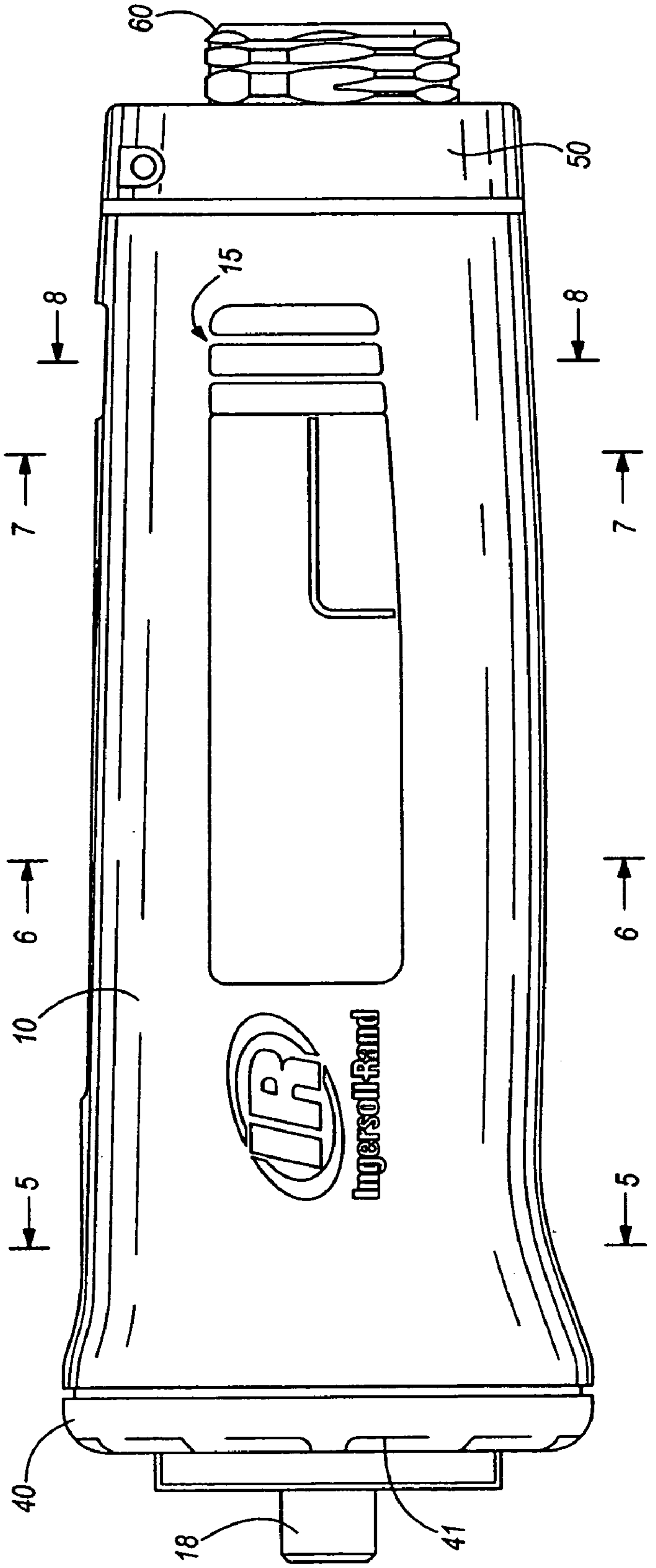
FIG. 1 is an elevational view of a grip portion of a fluid power tool according to the present invention.

The invention is best understood by reference to the accompanying drawings in which like reference numbers refer to like parts. It is emphasized that, according to common practice, the various dimensions of the component parts as shown in the drawings are not to scale and have been enlarged for clarity.

Although the figures shown represent a vane air motor powered tool it must be understood that these improvements may also apply to other types of tools as well. According to one aspect of the present invention, as described in greater detail below, intermediate components and power tools incorporating the same are provided. Generally, the intermediate components are structures disposed between a motor and an outer housing for directing the airflow and sealing air passages within fluid powered tools.

Figure 2:
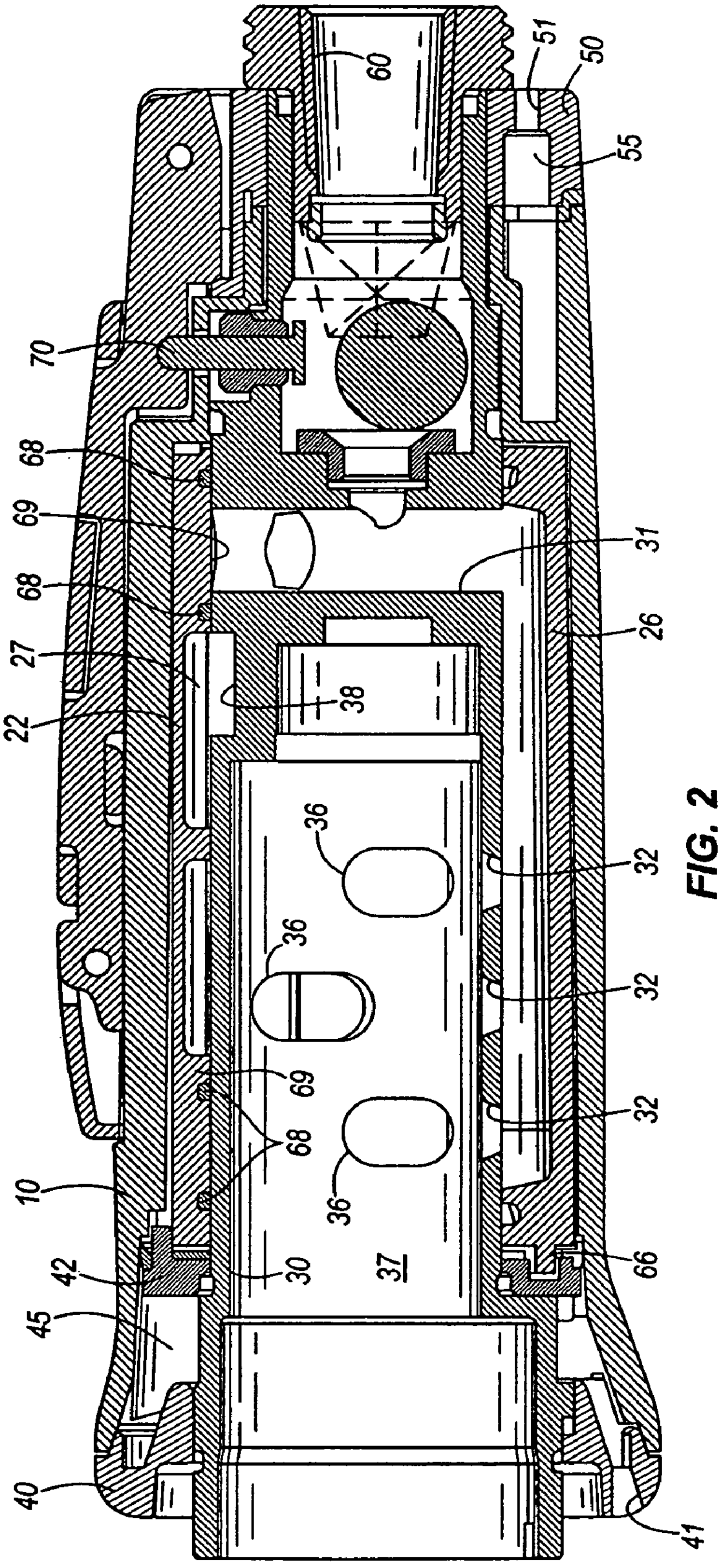
FIG. 2 is a longitudinal cross-sectional view of the grip portion of the handheld pneumatic power tool of FIG. 1 with the rotary components removed.
Figure 4:
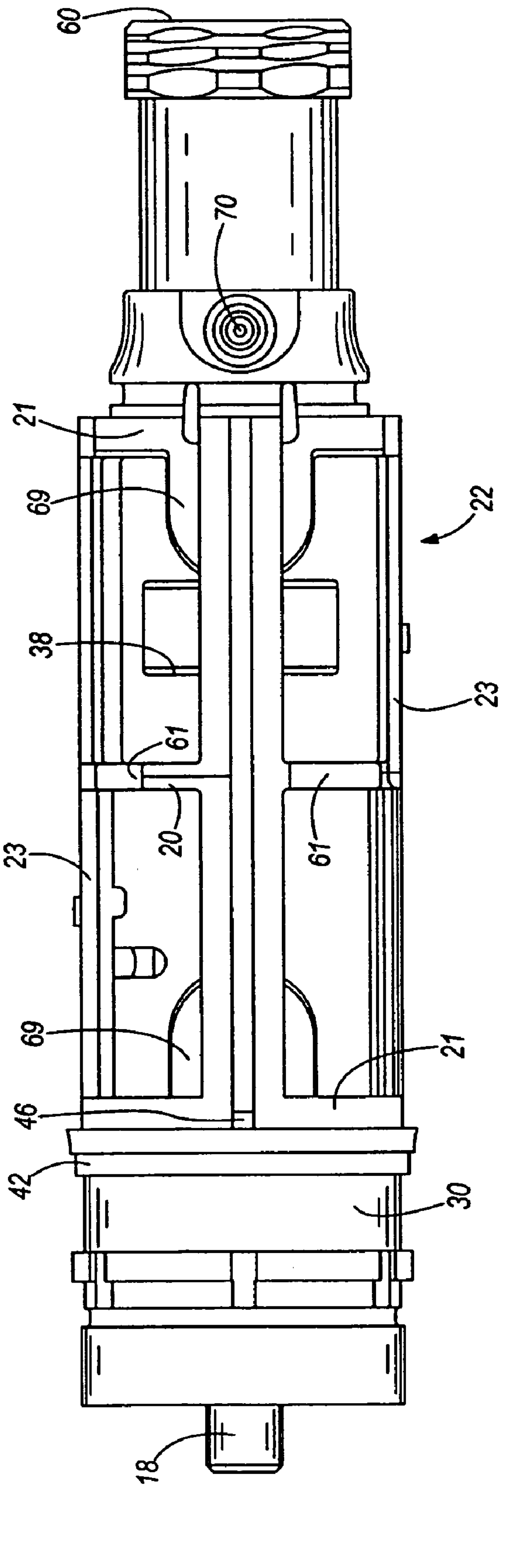
FIG. 4 is a top view of the tool shown in FIGS. 1 and 2 with outer housing removed.
Figure 3:
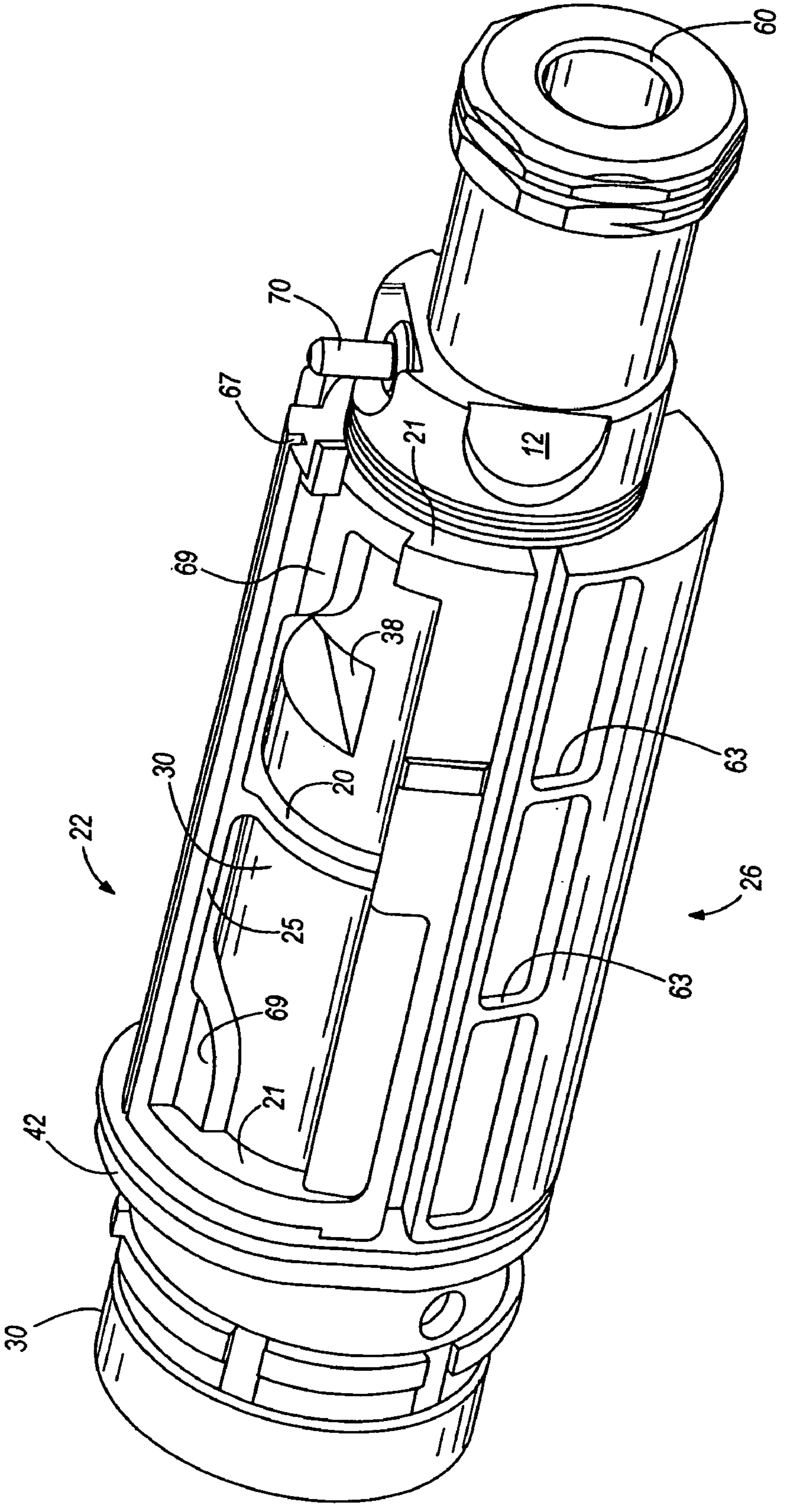
FIG. 3 is a perspective top view of the grip portion of the tool shown in FIGS. 1 and 2 with the outer housing removed.
Figure 5:
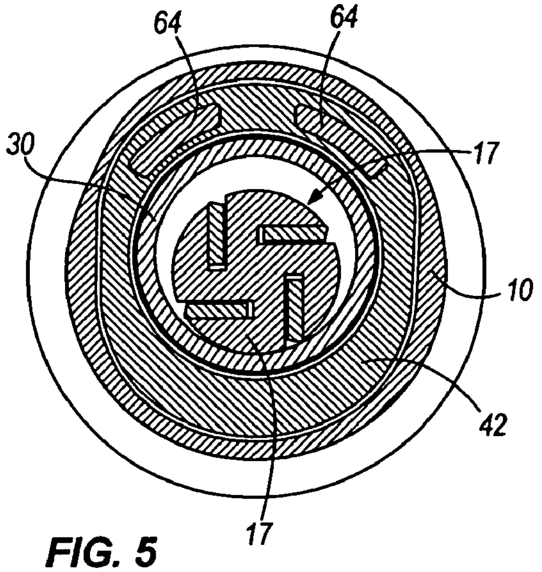
FIG. 5 is a cross-sectional view of the handheld pneumatic power tool of FIG. 1 taken along the sectional line designated as "5—5"

Referring now to FIG. 1, an exemplary fluid power tool according to the present invention is shown in the form of a handheld pneumatic power tool having a grip portion with an outer housing 10, a fluid inlet 60, and an output drive spindle 18 that extends through a front exhaust cap 40 inserted into the outer housing 10. Shown in FIG. 2 is the grip portion of the handheld pneumatic power tool of FIG. 1 with the rotary components, including a vane motor 17 (shown in FIG. 5) and output drive spindle 18, removed. Shown in FIGS. 3 and 4 are perspective and top views of the tool shown in FIGS. 1 and 2 with outer housing 10 removed. The vane motor 17, which is shown in the cross-sectional view of FIG. 5 produces rotary output for output drive spindle 18, however the present invention can be adapted for any fluid powered motor.

More specifically, and as shown in FIG. 2, a fluid driven tool is provided an outer housing 10 and an inner motor housing 30 nested in the outer housing 10 and defining a cavity 27 therebetween. The cavity 27 has a first end with a first exhaust passageway and a second end with a second exhaust passageway and a flow guide 22 disposed in the cavity 27. As shown in FIG. 2, inner motor housing 30 is provided with a motor chamber 37 having exhaust ports 36 through which exhaust fluid from the vane motor 17 exits the inner motor housing 30. Inner motor housing 30 further includes a passage 31 and inlet ports 32 which are in fluid communication by an inlet manifold 26, according to the present invention as described in greater detail below. Supply air to vane motor 17 is provided from fluid inlet 60 via a throttle control mechanism 70 that regulates air through inlet ports 32 to vane motor 17. A front exhaust cap 40, having front exhaust holes 41 and a front muffling chamber 45, and a rear exhaust cap 50, having rear exhaust holes 51 and a rear muffling chamber 55, are disposed on opposite ends of outer housing 10, through which exhaust air of vane motor 17 is selectively directed from exhaust ports 36.

Figure 9:
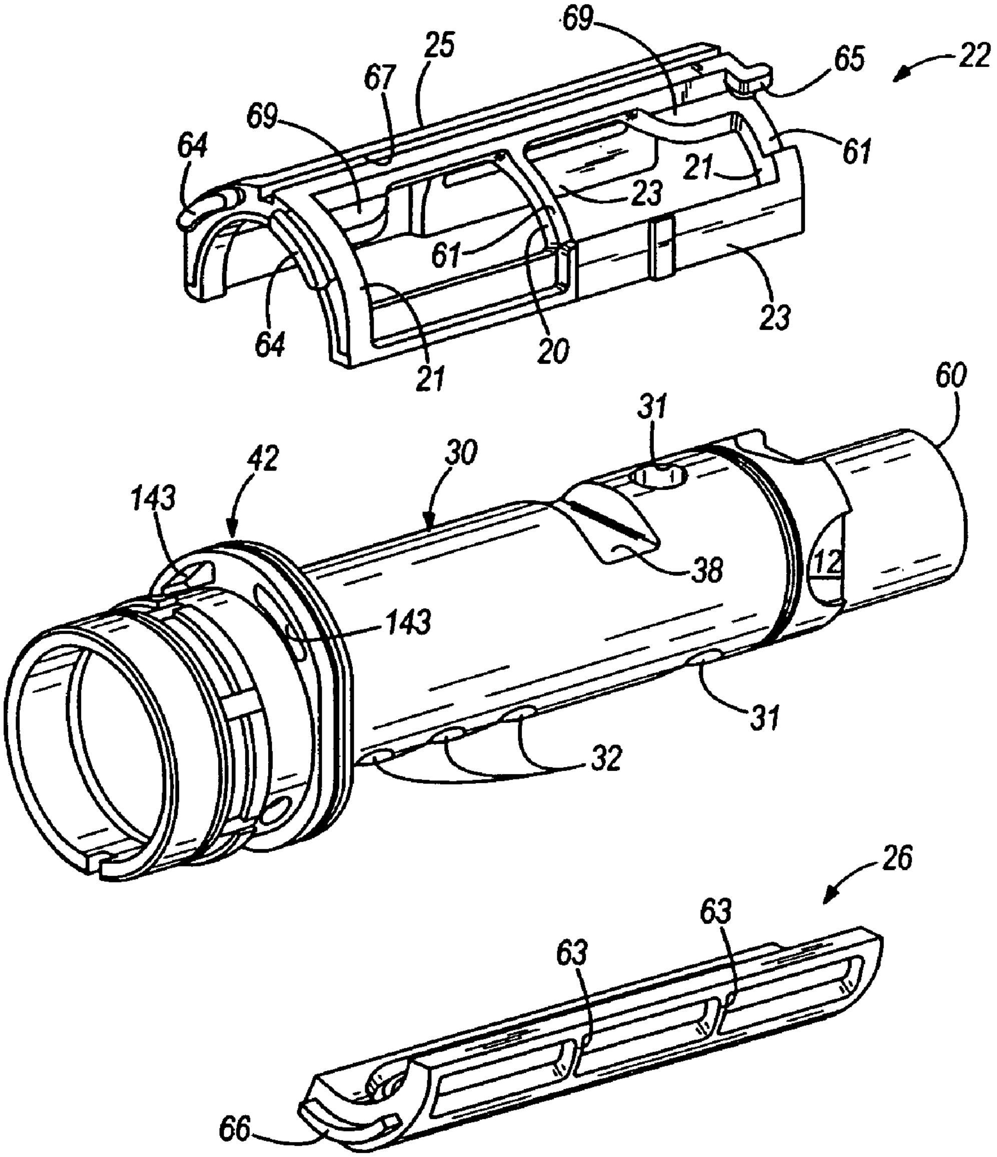
FIG. 9 is an exploded view illustrating exemplary intermediate components in relation to an inner motor housing according to the present invention.

Shown in FIG. 9 is an exploded view illustrating exemplary intermediate components according to the present invention in the form of an inlet manifold 26 and exhaust flow guide 22, removed from inner motor housing 30. Flow guide 22 has at least two longitudinal portions 23 disposed parallel to a longitudinal axis of the flow guide. The longitudinal portions 23 define a longitudinal channel 24 between the two longitudinal portions 23 in the cavity 27. At least one rib portion 21 connects the at least two longitudinal portions 23 and is configured for attachment on the inner motor housing 30 in a plane substantially transverse to the longitudinal axis. At least one portion of the at least one rib portion 21 located in the longitudinal channel is provided with a thickness less than a width of the cavity 27 surrounding the rib portion to define at least one circumferential recess 61 that permits fluid communication in the longitudinal channel across the at least one rib portion 21. The circumferential recess 61 can be located either on the radially outer portion of the rib (as shown best in FIGS. 12, 13, 15–17), on the radially inner portion of the rib (FIG. 27), or both (as shown best in FIGS. 25–26).

Figure 14:
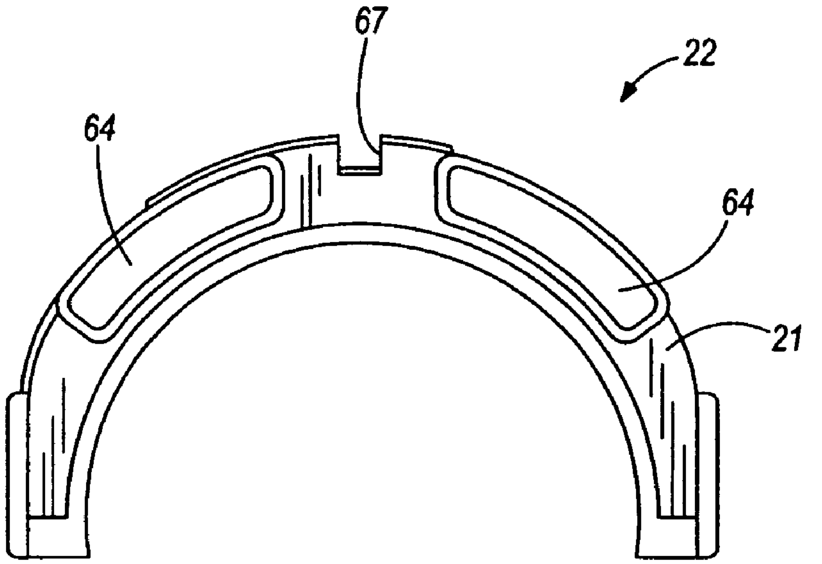
FIG. 14 is an end view of the flow guide shown in FIG. 12.
Figure 15:
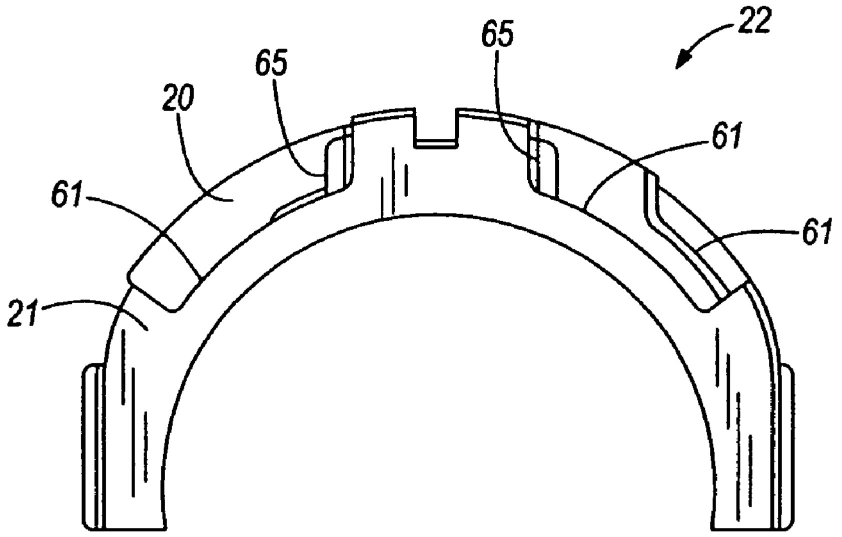
FIG. 15 is a rotated end view of the flow guide shown in FIG. 14.
Figure 16:
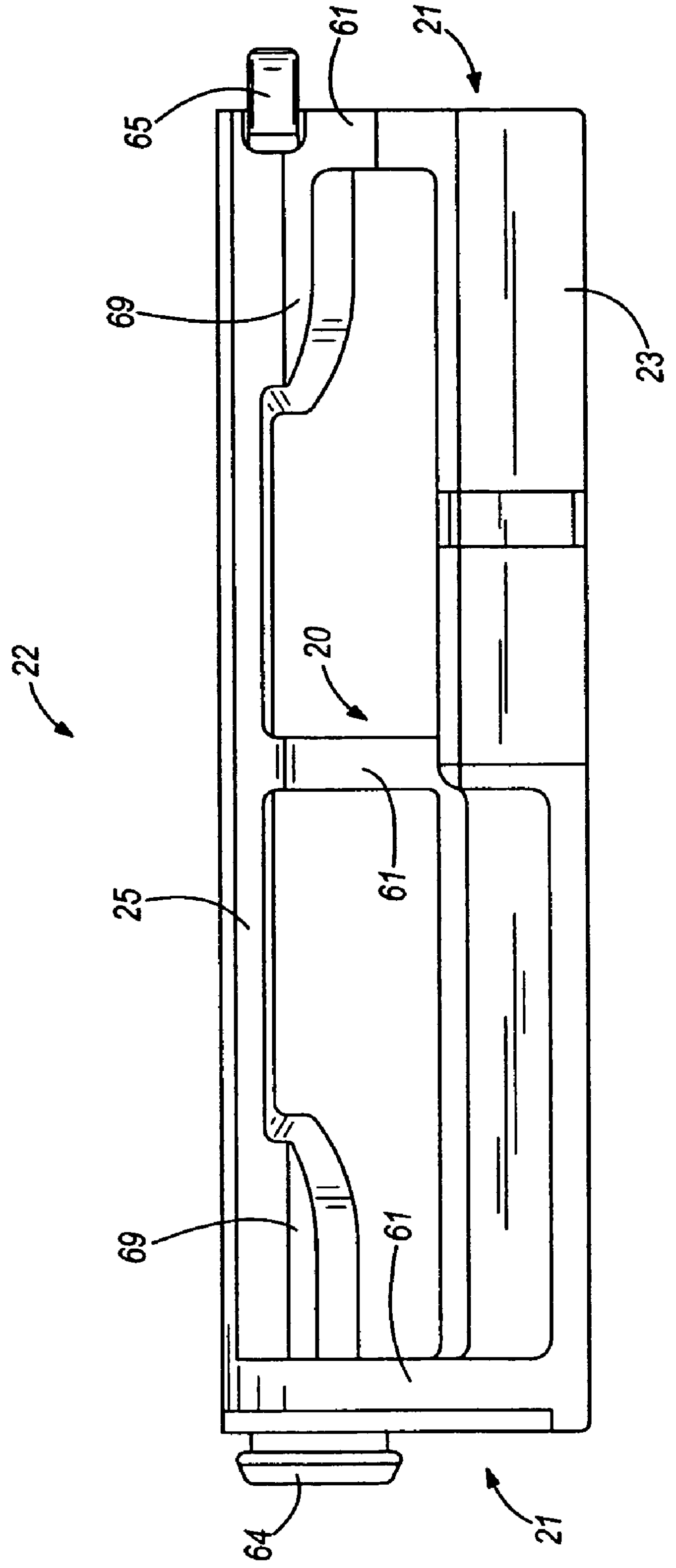
FIG. 16 is a side view of the flow guide shown in FIG. 12.
Figure 17:
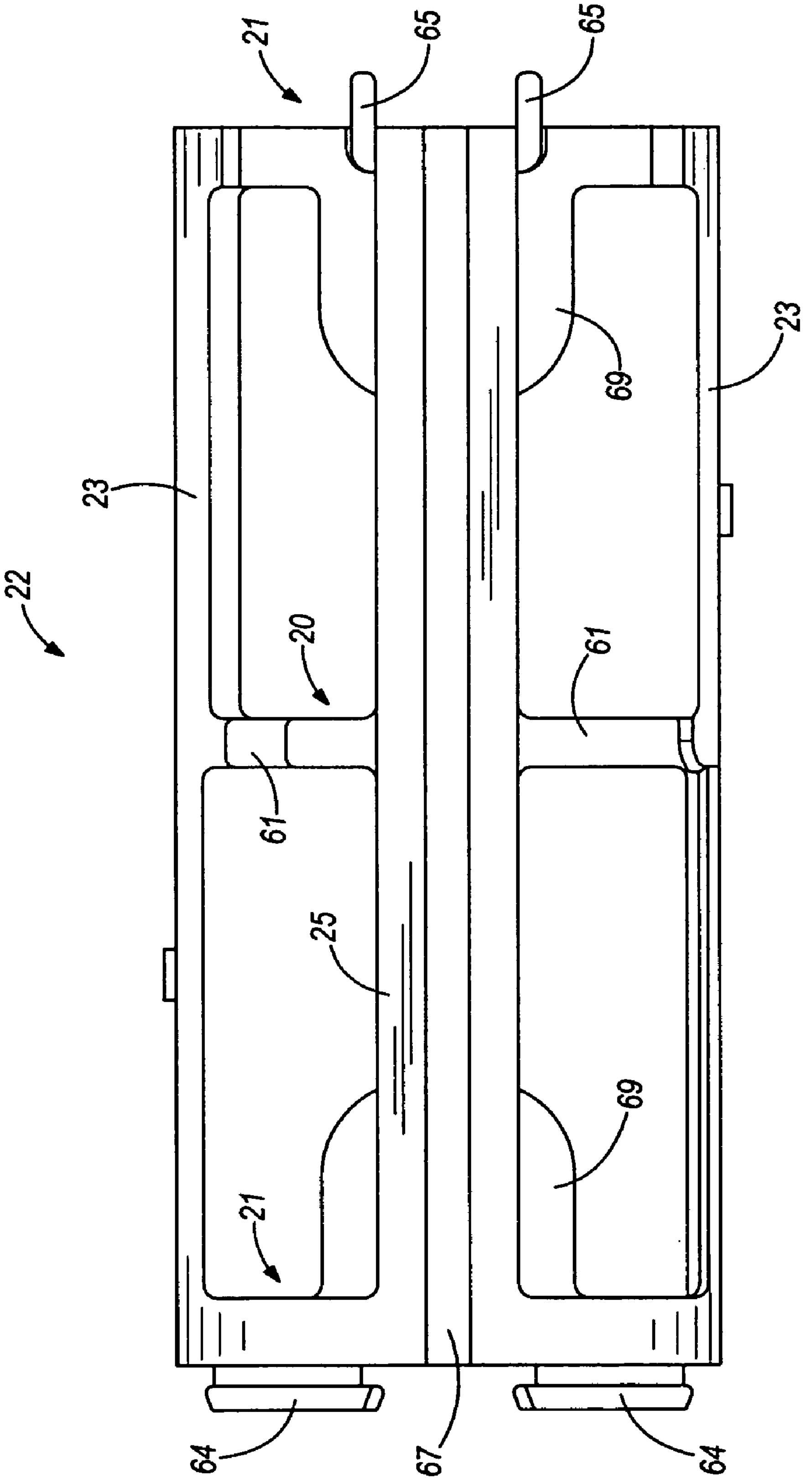
FIG. 17 is a top view of the flow guide shown in FIG. 12.

Flow guide 22 has a sealing end shown in FIG. 14 having at least one plug 64 and an exhaust end having at least one speed regulating tab 65 shown in FIG. 15 with both ends being substantially transverse to the longitudinal axis. The sealing end includes at least one plug 64 for sealing at least one exhaust passageway disposed in the cavity 27. As air leaves the motor chamber 37 through exhaust ports 36, flow is permitted to fill the cavity 27 formed between the outside of the inner motor housing 30 and the inside of the outer housing 10. As shown in FIG. 2, cavity 27 has a first end having a first exhaust passageway and a second end having a second exhaust passageway. Sealing of the first and second exhaust passageways is accomplished by inserting the at least one plug 64 of the flow guide 22 into a sealing arrangement alternately with the second and first exhaust passageways to permit fluid communication between the cavity 27 and the first and second exhaust passageways, respectively.

Figure 10:
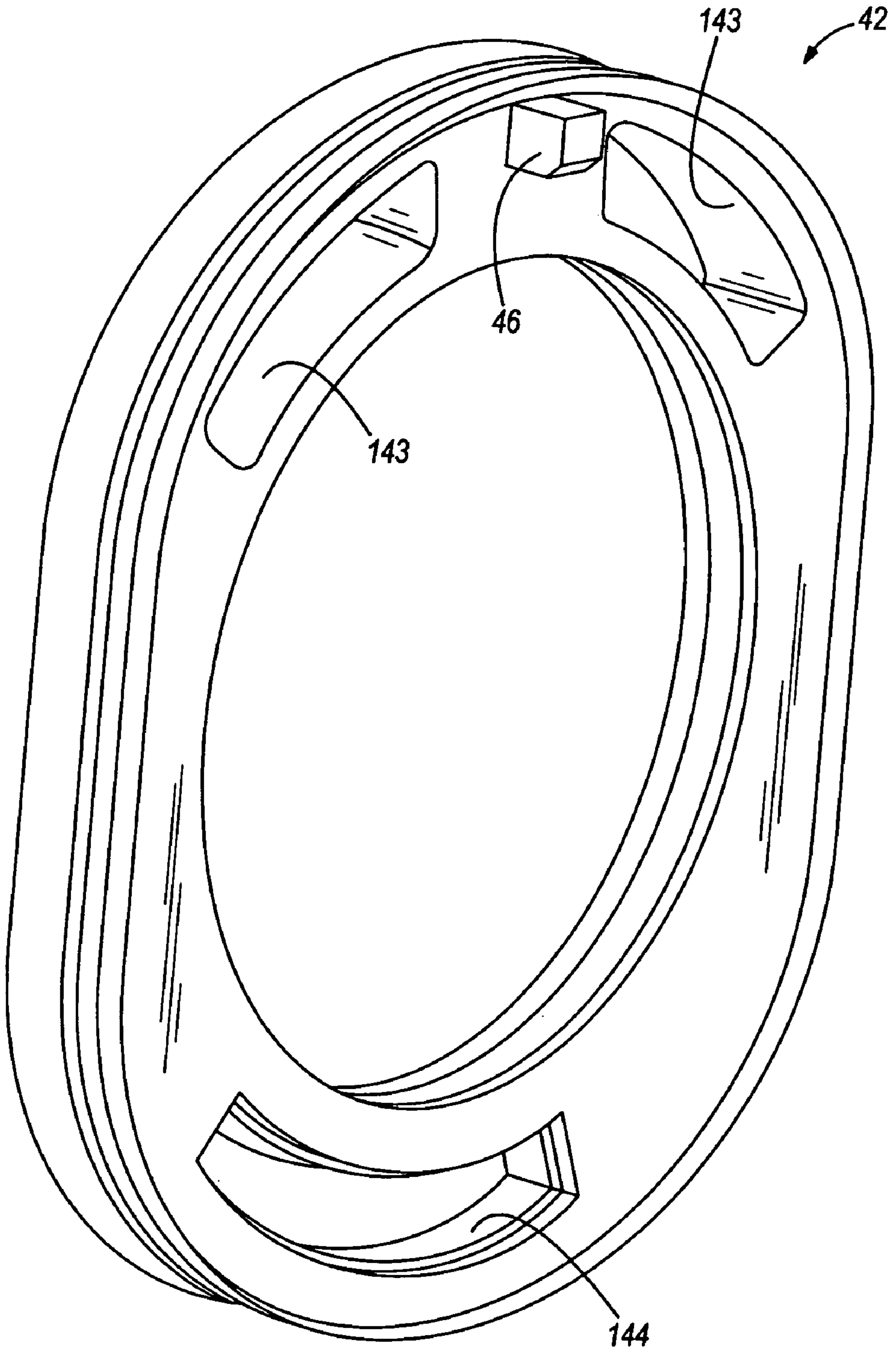
FIG. 10 is a perspective view of a sealing wall according to the present invention.

Preferably, a sealing wall 42 (shown in the perspective view of FIG. 10) is disposed around inner motor housing 30 having at least one aperture 143 through which the first exhaust passageway exhausts. The at least one aperture 143 is configured to alternately receive the at least one plug 64 and the at least one speed regulating tab 65 of the flow guide 22. To enhance sealing with sealing wall 42, an elastomeric surface is provided on the at least one plug 64, a face surrounding the at least one aperture 143, or both. This may be accomplished by overmolding a soft durometer material, such as a thermoplastic elastomer (TPE) or other suitable material, using a process such as that known in the art with respect to the overmolding of soft durometer handle grip materials onto tools.

The exhaust end of the flow guide 22 includes a rib portion 21 having a circumferential recess 61 that permits fluid communication in the longitudinal channel 24 across the rib portion into the corresponding exhaust passageway. At least one speed-regulating tab 65 may be disposed within the circumferential recess 61 on the rib portion 21 to partially restrict exhaust flow out of the tool, thereby limiting free running speed of the tool. By providing a plurality of interchangeable flow guides having speed regulating tabs 65 of varying sizes, the maximum free running speed of the tool may be varied by simply removing and reinserting an alternate flow guide having the desired level of restriction.

Figure 12:
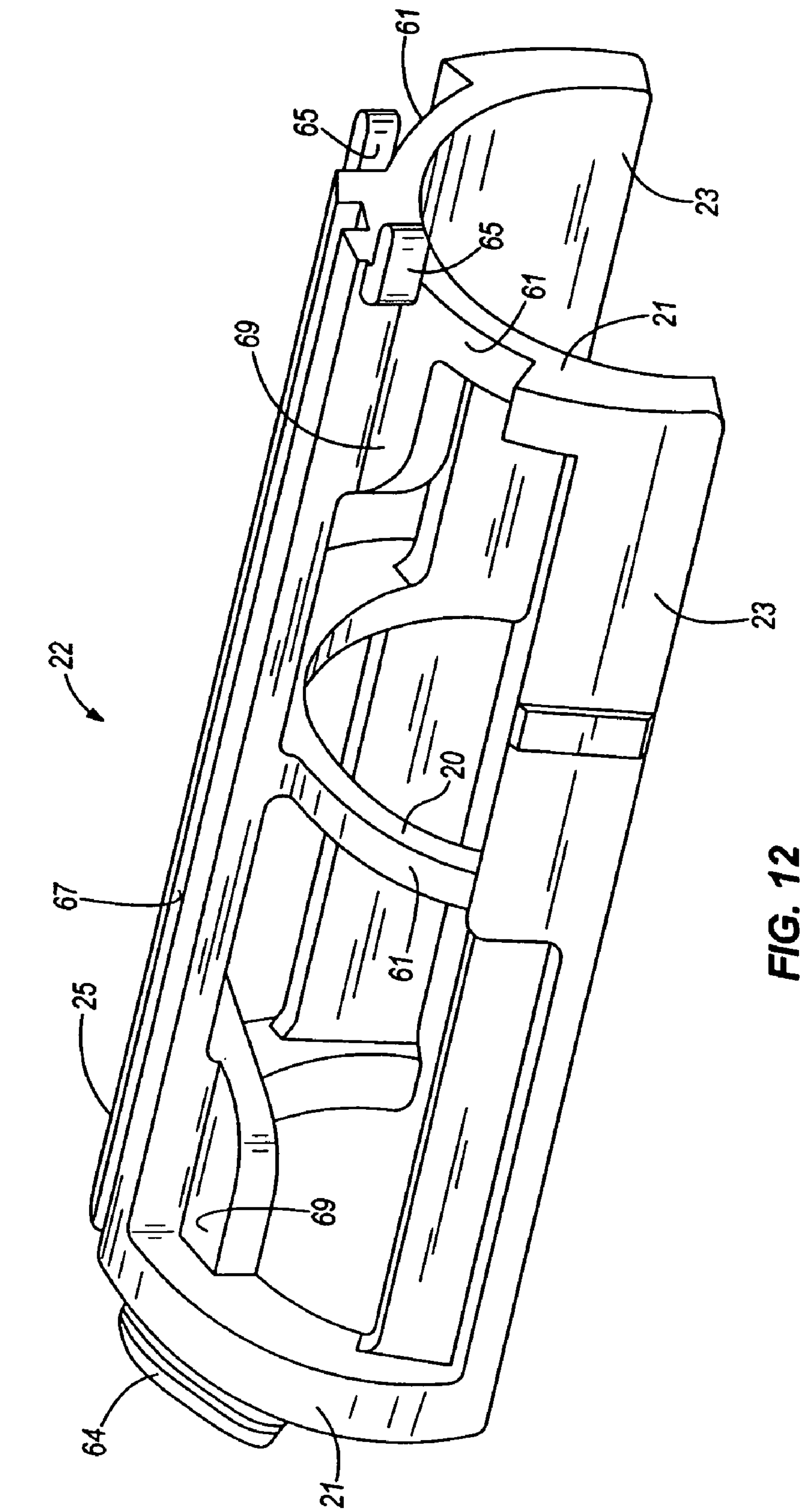
FIG. 12 is a perspective view of a flow guide according to the present invention.
Figure 13:
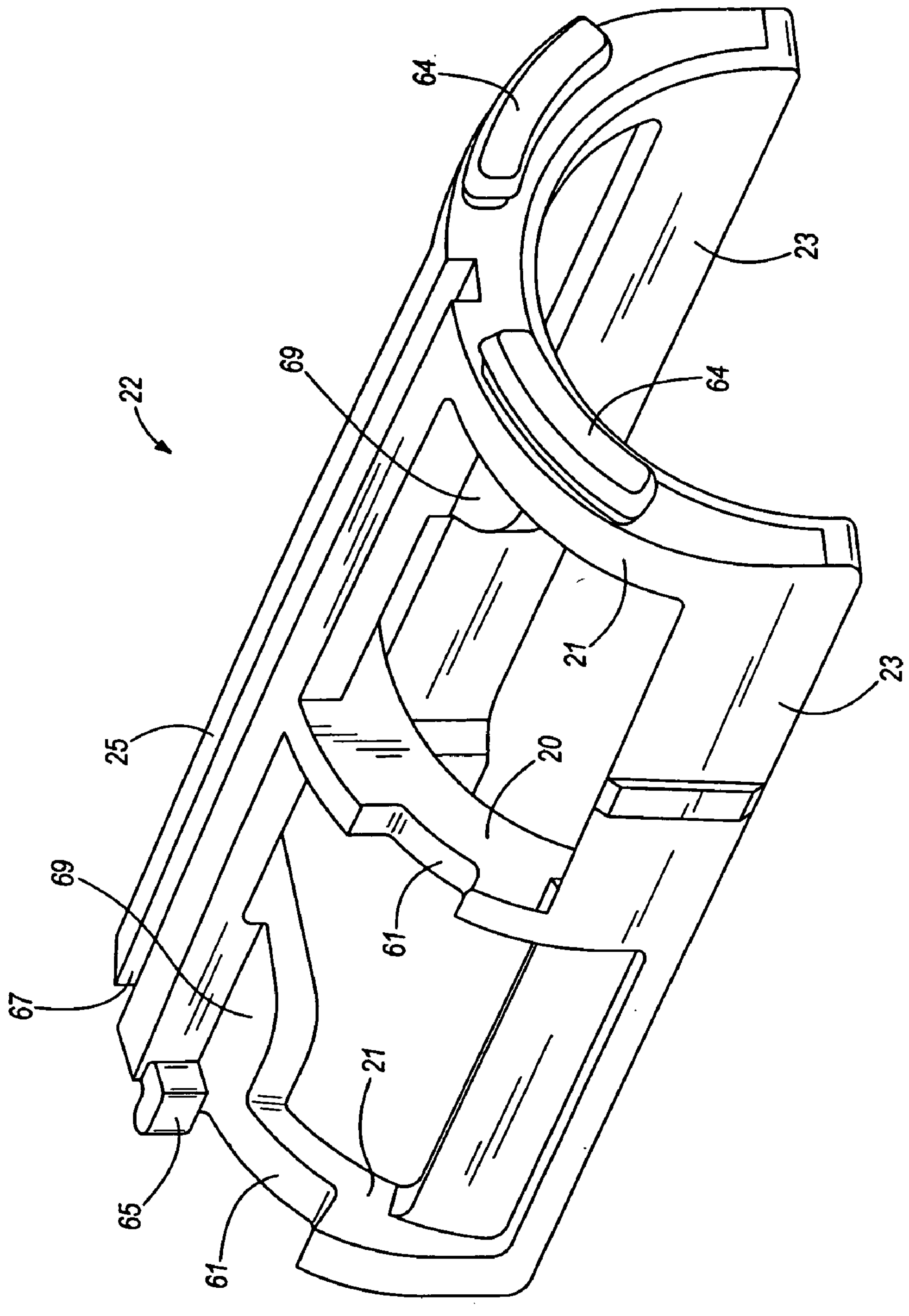
FIG. 13 is a rotated perspective view of the flow guide shown in FIG. 12.

By rotating the position of exhaust flow guide 22 from the orientation shown in FIG. 12 to the orientation shown in FIG. 13 and reinserting the flow guide 22 onto the inner motor housing 30, the direction of flow of exhaust air through either the rear or the front exhaust caps 50, 40 is respectively selected.

In the front exhaust configuration, exhaust air escapes through apertures 143 which provide axial exhaust passages in front exhaust sealing wall 42, into front muffling chamber 45 and then to atmosphere through exhaust holes 41 in the front exhaust cap 40. Speed regulating tabs 65 protruding from the flow guide 22 extend into the apertures 143 of sealing wall 42 thereby restricting air flow to the front exhaust passages as described above.

In the rear exhaust configuration, flow guide 22 is axially reversed so that the compliant plugs 64 block the apertures 143 of the sealing wall 42. Exhaust air escapes past the speed regulating tabs 65, through rear muffling chamber 55, and then to atmosphere through rear exhaust holes 51 in the rear exhaust cap 50.

Figure 6:
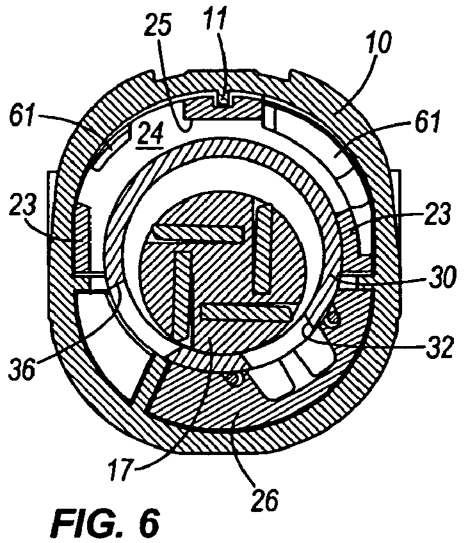
FIG. 6 is a cross-sectional view of the handheld pneumatic power tool of FIG. 1 taken along the sectional line designated as "6—6"

The flow guide 22 may also be used to provide a framework of passages for channeling exhaust air across surfaces of the inner motor housing 30 that require cooling and obstructing flow from surfaces that do not using rib portions. Exhaust air removes heat generated by the motor vanes, thus extending vane life. In this regard, the at least one rib portion 21 can further include at least one intermediate rib portion 20 located between the sealing and exhaust ends of the flow guide 22. The intermediate rib portion 20 connects the at least two longitudinal portions 23 to a third longitudinal portion 25 at points defining a plane substantially transverse to the longitudinal axis. Preferably third longitudinal portion 25 includes a longitudinal slot 67 that engages a spline 11 provided on the inner surface of outer housing 10 (as shown in FIG. 6) and a projection 46 provided on sealing wall 42 (shown in FIG. 10).

One or more portions of the intermediate rib portion 20 located in the longitudinal channel are provided with a thickness less than a width of the cavity 27 surrounding the rib. These reduced thickness portions define at least one circumferential recess 61 that permits fluid communication in the longitudinal channel 24 across the intermediate rib portion 20.

As can be seen in FIGS. 4, 12 and 13, the circumferential recesses 61 may have circumferential lengths that are unequal. In this fashion, different flow volumes and flow paths of air may be provided across the surface of the inner motor housing 30 to increase or decrease air flow to particular regions, thereby optimizing cooling of these regions. A recessed channel 38 may be provided in inner motor housing 30 to further increase surface area to be cooled and facilitate air flow across this region.

Figure 25:
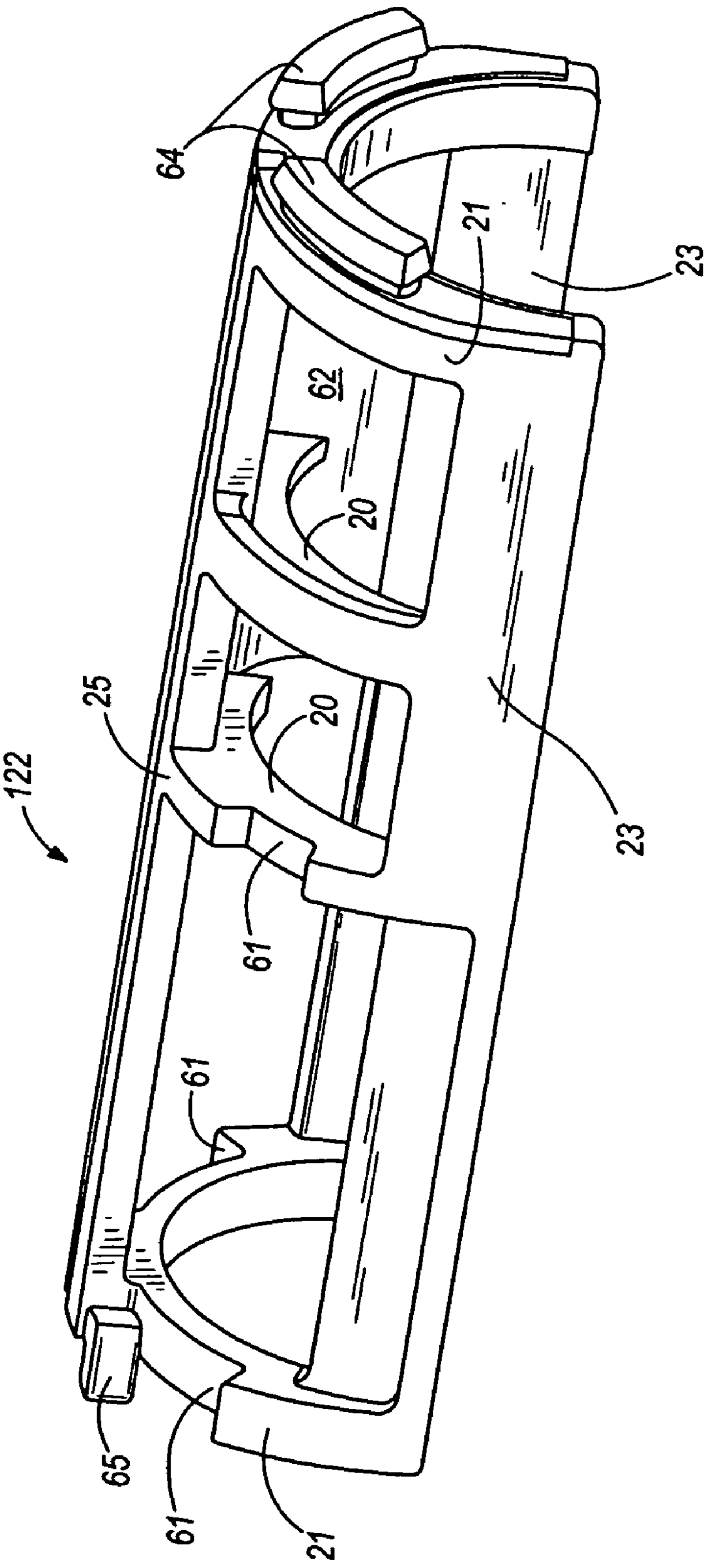
FIG. 25 is a top perspective view of an alternate flow guide according to the present invention.
Figure 26:
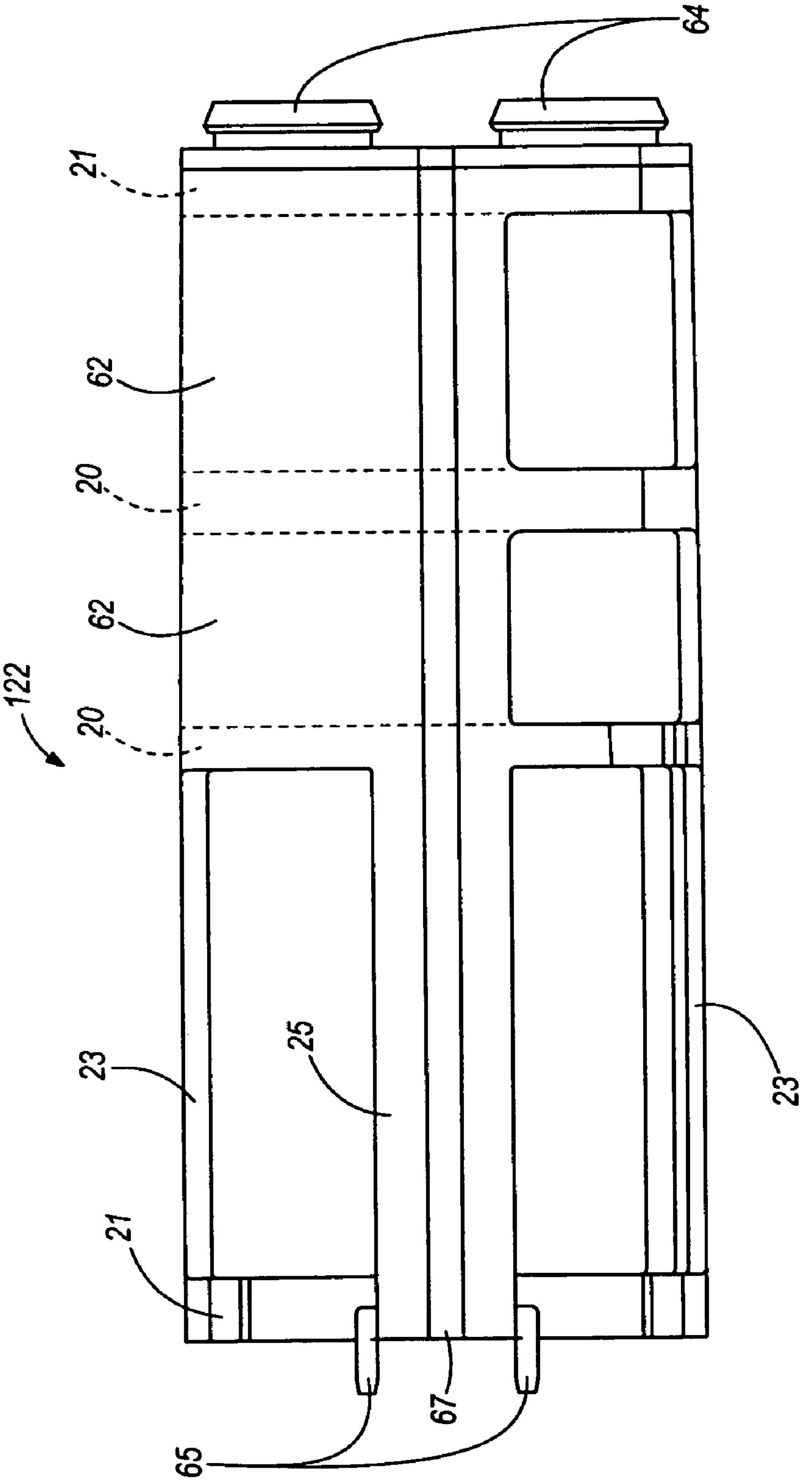
FIG. 26 is a top view of the alternate flow guide shown in FIG. 25.
Figure 27:
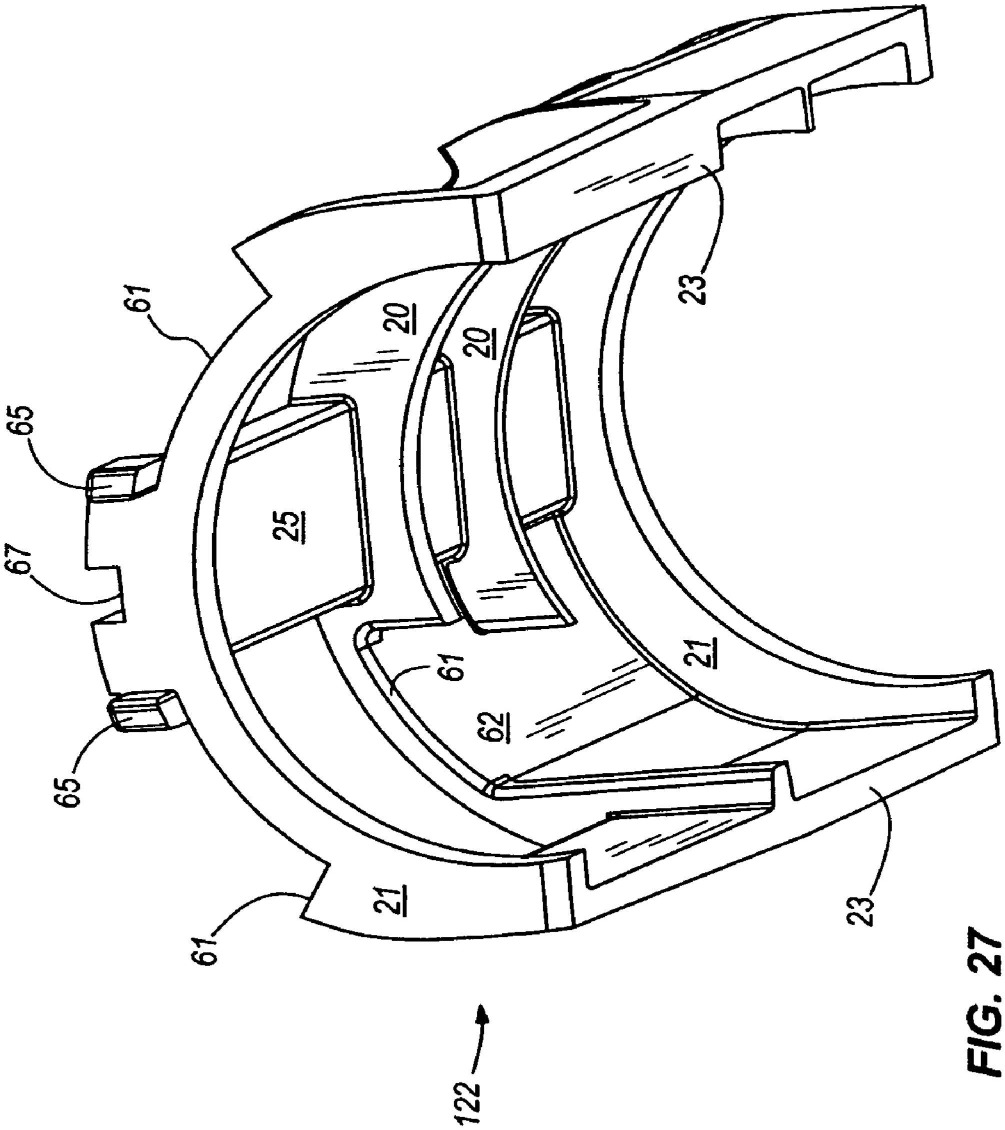
FIG. 27 is a bottom perspective view of the alternate inlet manifold shown in FIG. 25.

Shown in FIGS. 25–27, is a flow guide 122 in which the at least one intermediate rib portion 20 includes additional intermediate rib portions 20 disposed between the sealing and exhaust ends of the flow guide 122 to further channel air flow through cavity 27. Additionally, one or more sheet portions 62 that span between rib portions 20, 21 may also be incorporated as shown to facilitate directing air flow circumferentially within cavity 27.

As described above, the flow guide 22 selectively directs the flow of exhaust air through either the rear or the front exhaust caps 50, 40 depending on its orientation. The omission of the flow guide during assembly of the tool or its subsequent removal from the tool would otherwise permit exhaust air to escape simultaneously in both directions through the front and rear exhaust caps, resulting in an increase in the free running speed of the tool. To counteract this effect, flow guide 22 and inner motor housing 30 have been designed with an overspeed safety feature in the event that the flow guide 22 is omitted or removed from the tool construction.

As shown in FIGS. 2 and 9, inner motor housing 30 includes a through hole located transversely through the inner motor housing 30. The through hole defines an inlet passageway 31 which is in fluid communication with the fluid inlet 60, the cavity 27, and the at least one inlet port 32 of the motor chamber 37 as shown. At least one sealing member is provided that seals the fluid inlet 60 from the cavity 27 when the flow guide 22 is disposed in the cavity 27. Preferably the at least one sealing member is provided as an O-ring 68 that forms a seal between one end of inlet passageway 31 and flow guide 22 which holds the O-ring in place. As shown in FIG. 2, the O-ring 68 may be disposed in a closure portion 69 located on the flow guide 22 that covers the inlet passageway 31 when the flow guide 22 is disposed in the cavity 27. O-ring 68 may also be sized to fit within the inlet passageway 31 and held in place by a post or boss portion (not shown) provided on the flow guide 22. It is envisioned that this latter configuration may be employed to decrease the area of inner motor housing that is covered in order to decrease heat build-up and increase the amount of cooling air circulating over the surface surrounding the blocked port.

By this construction, the inlet passageway 31 has an extra hole in the side of inner motor housing 30, which in the absence of flow guide 22, connects motive air from fluid inlet 60 to exhaust via cavity 27. When flow guide 22 is in place, a seal provided by O-ring 68 blocks this passage so that the tool runs at the correct speed. When flow guide 22 is removed, high pressure air is permitted to bypass the motor 17, resulting in low speed and power. It becomes obvious to a user that something is wrong with the tool. With an O-ring seal provided on both ends of flow guide 22 as shown, an inner motor housing port provided by one end of inlet passageway 31 is blocked regardless of whether the tool is configured for front or rear exhaust.

Figure 7:
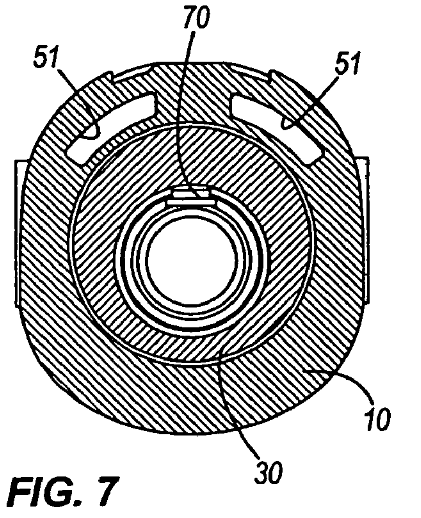
FIG. 7 is a cross-sectional view of the handheld pneumatic power tool of FIG. 1 taken along the sectional line designated as "7—7"
Figure 11:
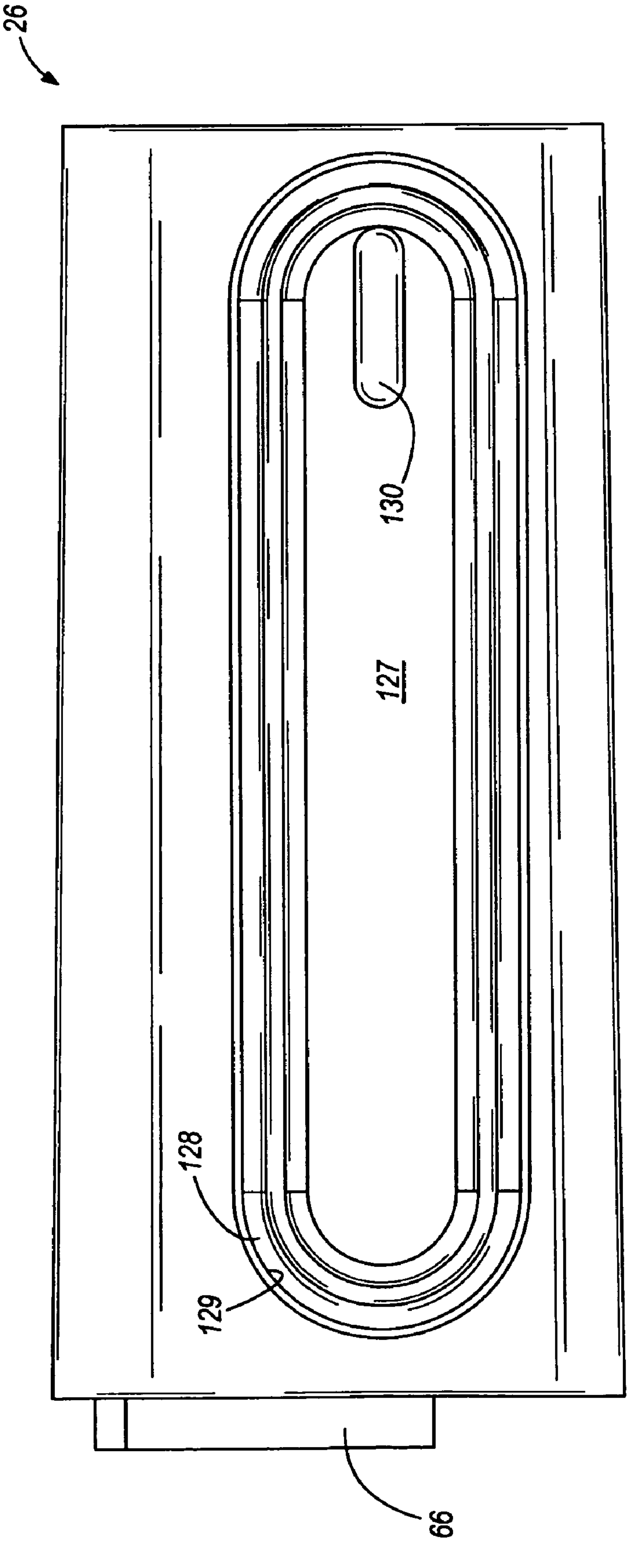
FIG. 11 is a top view of an inlet manifold according to the present invention.

Other intermediate components for directing fluid may also be incorporated into a tool according to the present invention. Shown in FIGS. 9 and 11 is an inlet manifold 26 having a recessed portion 127 with a surrounding seal configured to engage inner motor housing 30. When placed in cavity 27 as shown in FIG. 2, inlet manifold 26 connects the fluid inlet 60 to the at least one inlet port 32 of the inner motor housing 30. In FIG. 9 the inlet manifold 26 has been removed to reveal the inlet ports 32 of the motor chamber 37. A motive fluid, typically, air enters the tool through fluid inlet 60, as shown in FIGS. 2 and 7, passes the throttle control mechanism 70 into inlet manifold 26 via inlet passageway 31. Once in the inlet manifold 26, air enters the motor 17 through inlet ports 32 as shown in FIG. 6.

Figure 23:
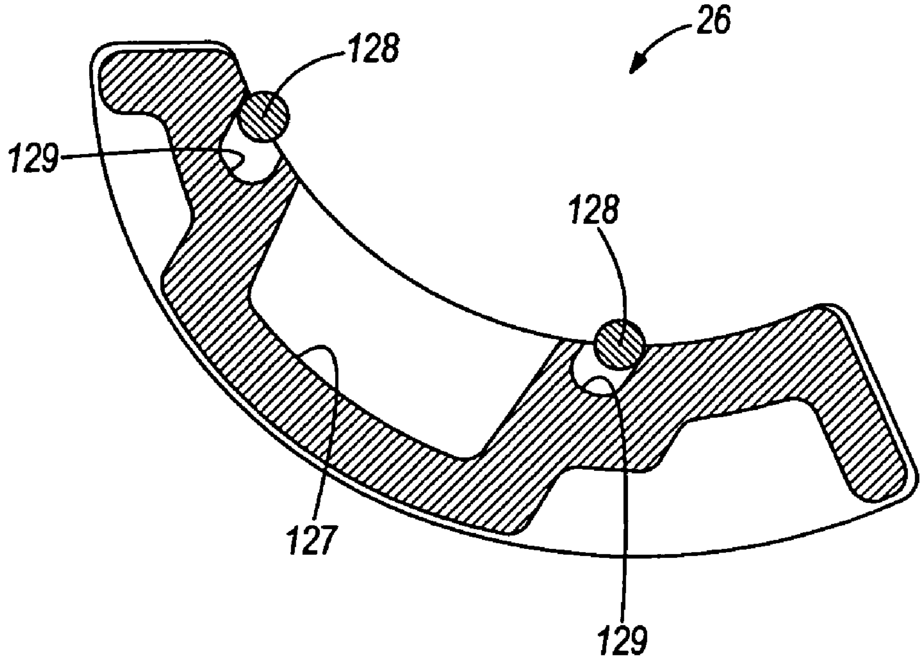
FIG. 23 is a cross-sectional view of an inlet manifold having a pressure activated seal according to the present invention.
Figure 24:
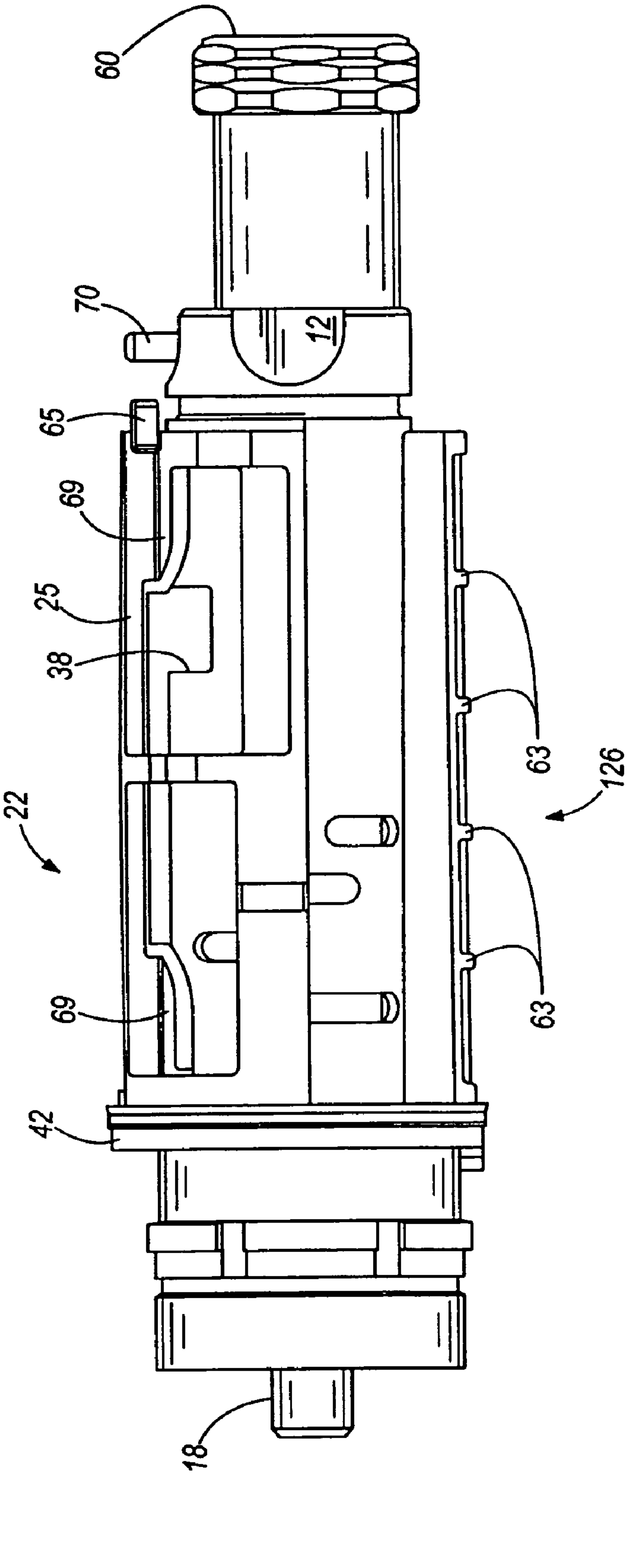
FIG. 24 is a side view of an exemplary fluid power tool with the outer housing removed to show the alternate inlet manifold of FIG. 18.

The seal surrounding recessed portion 127 is preferably a pressure activated seal disposed between the inlet manifold 26 and the outer wall of the inner motor housing 30. Preferably, the seal is an O-ring 128 disposed in an angled groove 129 around the recessed portion 127 as shown in FIGS. 11 and 23, such that upon receiving fluid pressure from the fluid inlet 60, the seal actively conforms to sealingly engage the inner motor housing 30.

Figure 18:
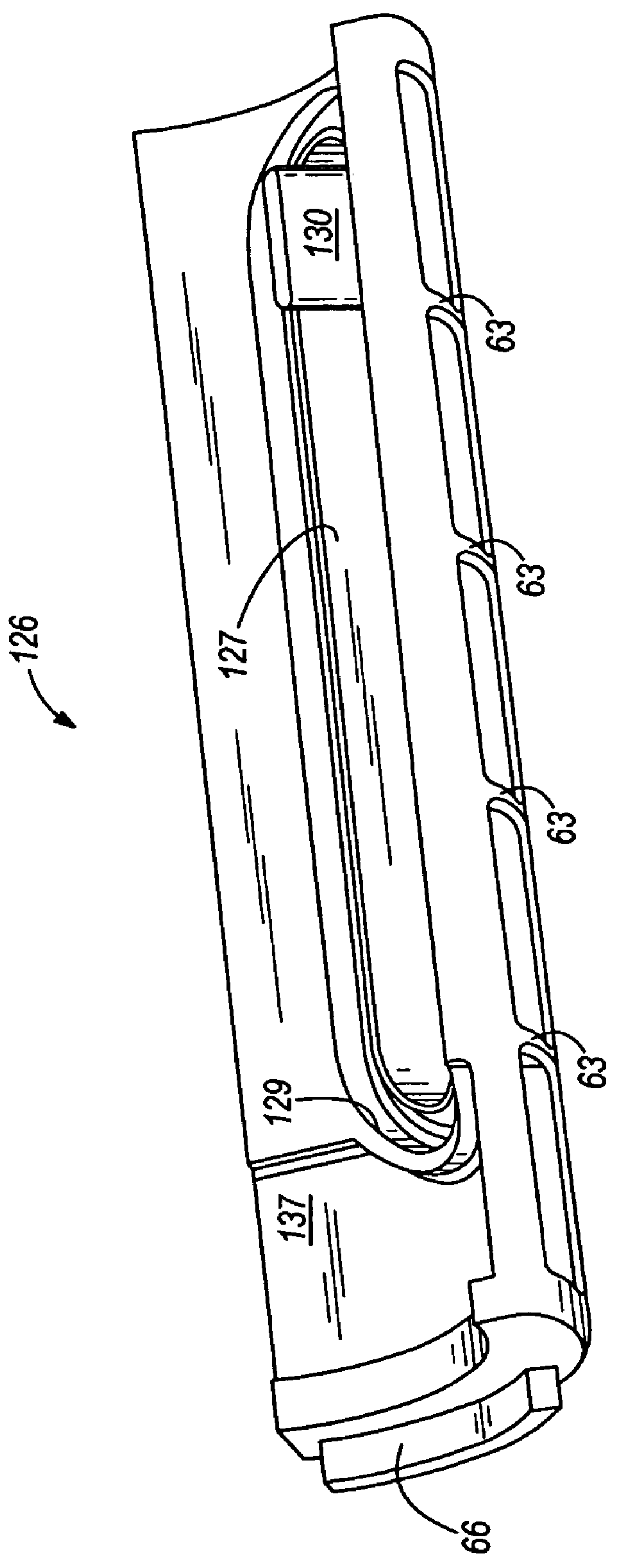
FIG. 18 is a top perspective view of an alternate inlet manifold according to the present invention.
Figure 19:
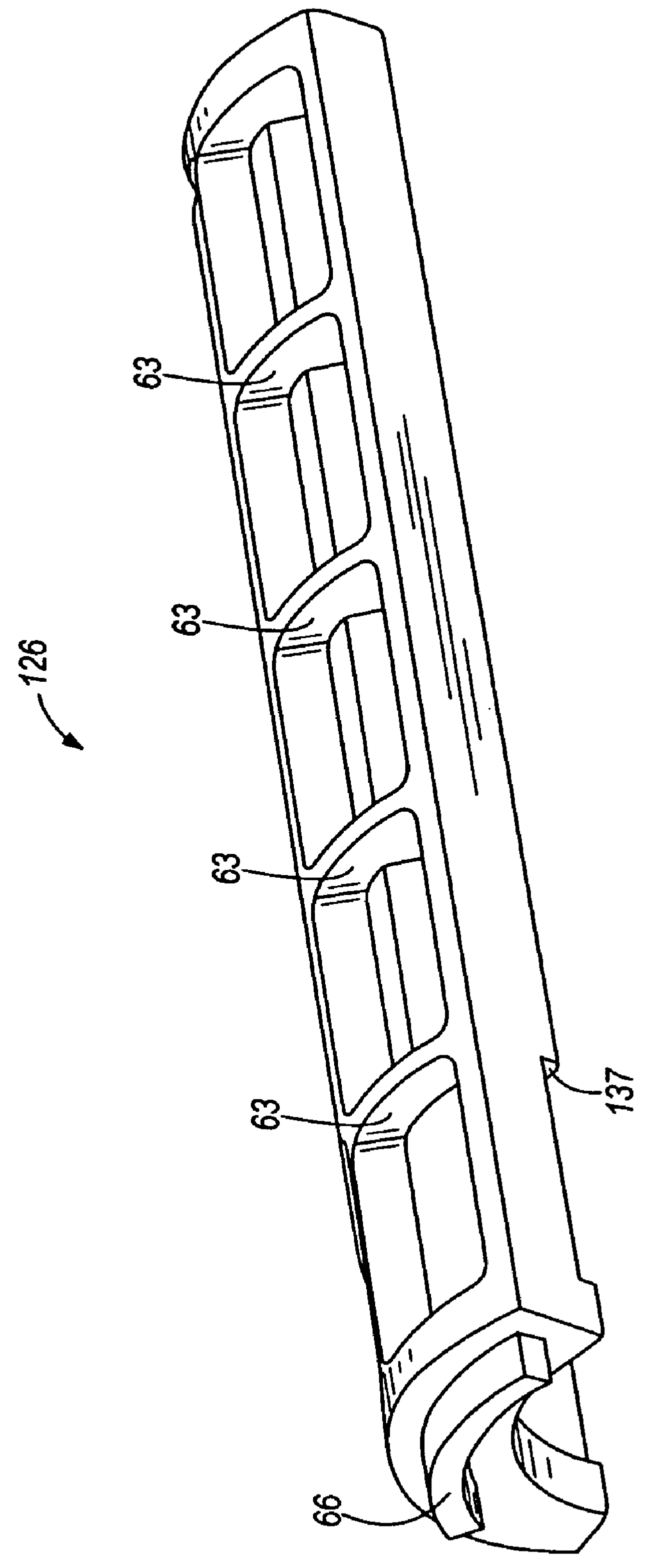
FIG. 19 is a rotated perspective view of the alternate inlet manifold shown in FIG. 18.

As shown in FIG. 18, an inlet manifold 126 may also be provided with a second recessed portion 137 that is partially open to cavity 27 when inserted therein to receive fluid flow for cooling the inner motor housing 30 disposed underneath.

Figure 20:
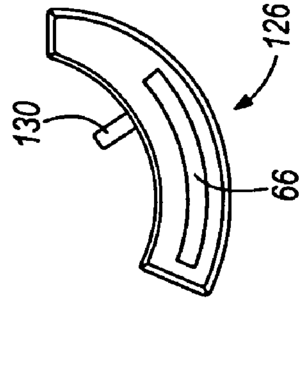
FIG. 20 is an end view of the alternate inlet manifold shown in FIG. 18.
Figure 21:
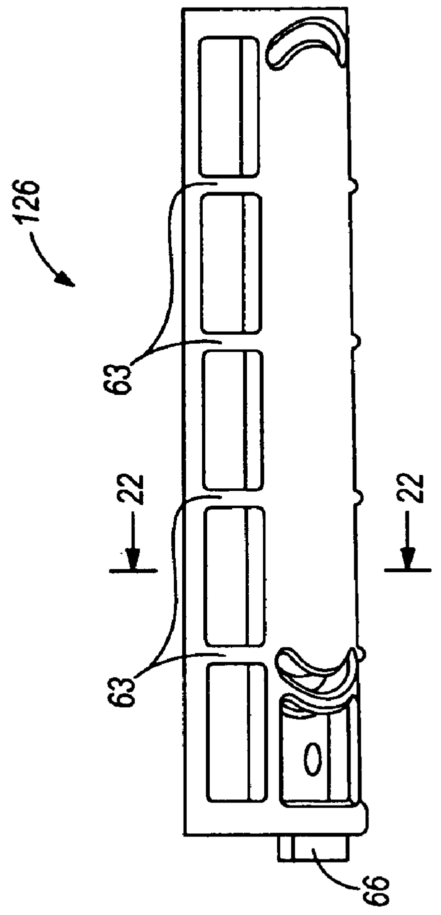
FIG. 21 is a side view of alternate inlet manifold shown in FIG. 18.
Figure 22:
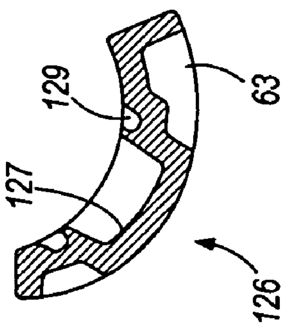
FIG. 22 is a sectional view of the alternate inlet manifold according to the present invention taken along the sectional line "22—22" in FIG. 21.

Preferably, a boss 130 such as that shown in FIGS. 18 and 20 is provided that does not close off, but merely engages the hole of inlet passageway 31. The boss 130 facilitates alignment of the recessed portion 127 over the at least one inlet port 32 and the inlet passageway 31 during insertion in cavity 27. A projection 66 disposed on the inlet manifold 26 is provided that inserts into a corresponding recess 144 located in sealing wall 42. Preferably, inlet manifolds 26, 126 are molded components that are provided with reinforcing ribs 63 to reduce deflection that can result from internal pressure loading.

Referring back to FIG. 2, although the outer housing 10 is primarily supported by the front cap in the front and the motor housing in the rear, the inlet manifold and flow guide form a rigid structure providing additional support in the central portion of the outer housing 10.

Figure 8:
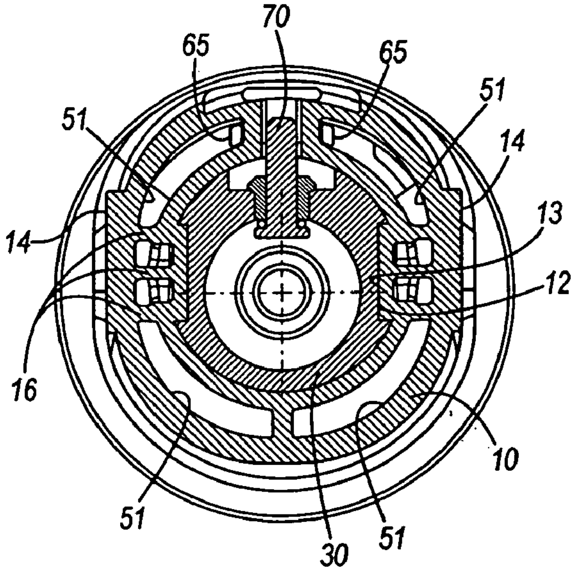
FIG. 8 is a cross-sectional view of the handheld pneumatic power tool of FIG. 1 taken along the sectional line designated as "8—8"

According to another aspect of the present invention, assembly of a fluid driven tool is facilitated by a mating structure provided between the outer housing 10 and the inner motor housing 30. The mating structure assists in assembly of the tool components and is best seen in the transverse section of FIG. 8 and includes an inner surface 13 of the outer housing 10 and an outer surface 12 of the inner motor housing 30 having portions that mate upon nesting the inner motor housing 30 in the outer housing 10. Provided on the outer housing 10 are opposed outer clamping regions 14 which are connected to inner surfaces 13. Clamping pads 15 (shown in FIG. 1) are preferably provided in the clamping regions 14, the clamping pads 15 having a surface shape or texture to provide enhanced gripping ability. Outer clamping regions 14 may be connected to inner surfaces 13 by a solid wall thickness located therebetween or by spacer struts 16 as shown. The handle structure having this mating structure provides reinforced areas for clamping the outer housing 10 at regions 14, whereby stresses exerted thereon are transferred through and supported by the inner motor housing 30 which, preferably, is made of a metallic or other strengthened material and inserted into the inner motor housing 30 prior to clamping in a vise or other assembly fixture.

The intermediate components of the present invention, including the flow guides and inlet manifolds described above, may be molded from a rigid composite material such as a glass-reinforced nylon available as CAPRON® from BASF Corporation, Germany. The compliant plugs and sealing portions may be molded over or otherwise attached to the framework and, preferably, are made of a soft durometer, thermoplastic elastomer (TPE) material. In the case of overmolding on a nylon intermediate component, compatible TPE materials for this purpose include those such as VERSAFLEX® OM6160-9 available from GLS Corporation, McHenry, Ill.

While embodiments and applications of this invention have been shown and described, it will be apparent to those skilled in the art that many more modifications are possible without departing from the inventive concepts herein described. For example, although described above with respect to use with air grinders, it is contemplated that the intermediate components and handle structure shown and described may be incorporated into other pneumatic devices. It is understood, therefore, that the invention is capable of modification and therefore is not to be limited to the precise details set forth. Rather, various modifications may be made in the details within the scope and range of equivalents of the claims without departing from the spirit of the invention.

What is claimed is:

1. A flow guide configured for insertion in a cavity defined between an outer housing and a nested inner motor housing of a fluid driven tool, the flow guide having a longitudinal axis and comprising:

at least two longitudinal portions disposed parallel to the longitudinal axis and defining a longitudinal channel therebetween, and a rib connecting the at least two longitudinal portions at points defining a plane substantially transverse to the longitudinal axis, wherein the rib at least partially defines a recess that permits fluid flow through the longitudinal channel past the rib; and wherein the recess permits fluid communication along the longitudinal channel between the rib and the outer motor housing.

2. The flow guide according to claim 1, wherein the recess extends across a radially outer portion of the rib.

3. The flow guide according to claim 1 further comprising a sealing end and an exhaust end substantially transverse to the longitudinal axis, the sealing end comprising at least one plug for sealing at least one exhaust passageway disposed in the cavity.

4. The flow guide according to claim 3, wherein the cavity has a first end having a first exhaust passageway and a second end having a second exhaust passageway, the first and second exhaust passageways being selected by inserting the at least one plug of the flow guide into a sealing arrangement alternately with the second and first exhaust passageways to permit fluid communication between the cavity and the first and second exhaust passageways, respectively.

5. The flow guide according to claim 3, wherein the exhaust end of the flow guide comprises the rib thereby permitting fluid communication in the longitudinal channel across the rib into the corresponding exhaust passageway.

6. The flow guide according to claim 5 further comprising at least one speed regulating tab disposed within the recess.

7. The flow guide according to claim 5, wherein the rib further comprises an intermediate rib located between the sealing and exhaust ends of the flow guide.

8. The flow guide according to claim 7, wherein the at least two longitudinal portions comprise first, second, and third longitudinal portions disposed parallel to the longitudinal axis, the intermediate rib connecting the first, second, and third longitudinal portions at points defining a plane substantially transverse to the longitudinal axis, wherein the intermediate rib defines a recess that permits fluid communication in the longitudinal channel across the intermediate rib.

9. The flow guide according to claim 8, wherein the recess of the intermediate rib comprises at least two recesses having unequal circumferential lengths.

10. The flow guide according to claim 8, wherein the rib further comprises at least one additional intermediate rib located between the sealing and exhaust ends of the flow guide and a sheet portion that spans between at least two ribs.

11. The fluid driven tool according to claim 3, wherein the exhaust end of the flow guide comprises the rib thereby permitting fluid communication in the longitudinal channel across the rib into the corresponding exhaust passageway.

12. The fluid driven tool according to claim 11 further comprising at least one speed regulating tab disposed within the recess.

13. The fluid driven tool according to claim 12 further comprising a sealing wall disposed around the inner motor housing, the sealing wall having at least one aperture through which the first exhaust passageway exhausts, the at least one aperture configured to alternately receive the at least one plug and the at least one speed regulating tab of the flow guide.

14. The fluid driven tool according to claim 13, wherein the at least one plug further comprises an elastomeric sealing surface.

15. The fluid driven tool according to claim 13, wherein the sealing wall further comprises an elastomeric surface on a face surrounding the at least one aperture.

16. The fluid driven tool according to claim 11, wherein the rib further comprises an intermediate rib located between the sealing and exhaust ends of the flow guide.

17. The fluid driven tool according to claim 16, wherein the at least two longitudinal portions comprise first, second, and third longitudinal portions disposed parallel to the longitudinal axis, the intermediate rib connecting the first, second, and third longitudinal portions at points defining a plane substantially transverse to the longitudinal axis, wherein the intermediate rib defines a recess that permits fluid communication in the longitudinal channel across the intermediate rib.

18. The fluid driven tool according to claim 17, wherein the recess of the intermediate rib comprises at least two recesses having unequal circumferential lengths.

19. The fluid driven tool according to claim 17, wherein the rib further comprises at least one additional rib disposed between the sealing and exhaust ends of the flow guide and a sheet portion that spans between at least two ribs.

20. A fluid driven tool comprising:

an outer housing and an inner motor housing nested in the outer housing and defining a cavity therebetween, the cavity having a first end with a first exhaust passageway and a second end with a second exhaust passageway;

a flow guide disposed in the cavity, the flow guide having a longitudinal axis and comprising at least two longitudinal portions disposed parallel to the longitudinal axis and defining a longitudinal channel between the two longitudinal portions in the cavity, and a rib connecting the at least two longitudinal portions and configured for attachment on the inner motor housing in a plane substantially transverse to the longitudinal axis, wherein the rib at least partially defines a recess that permits fluid flow through the longitudinal channel across the rib; and wherein the recess permits fluid communication along the longitudinal channel between the rib and the outer motor housing.

21. The fluid driven tool according to claim 20, wherein the recess extends across a radially outer portion of the rib.

22. The fluid driven tool according to claim 20, the flow guide having a sealing end and an exhaust end substantially transverse to the longitudinal axis, the sealing end comprising at least one plug for sealing at least one exhaust passageway disposed in the cavity.

23. The fluid driven tool according to claim 22, wherein the cavity has a first end having a first exhaust passageway and a second end having a second exhaust passageway, the first and second exhaust passageways being selected by inserting the at least one plug of the flow guide into a sealing arrangement alternately with the second and first exhaust passageways to permit fluid communication between the cavity and the first and second exhaust passageways, respectively.

24. The fluid driven tool according to claim 20, wherein the inner motor housing further comprises a motor chamber having at least one inlet port for a fluid driven motor, a fluid inlet, and a through hole located transversely through the inner motor housing, the through hole defining an inlet passageway in fluid communication with the fluid inlet, the cavity, and the at least one inlet port of the motor chamber.

25. The fluid driven tool according to claim 24 further comprising at least one sealing member that seals the fluid inlet from the cavity when the flow guide is disposed in the cavity.

26. The fluid driven tool according to claim 25, wherein the sealing member is an O-ring disposed in a cover portion located on the flow guide that covers the inlet passageway when the flow guide is disposed in the cavity.

27. The fluid driven tool according to claim 25, wherein the sealing member is an O-ring disposed in the inlet passageway and held in place by a corresponding boss portion located on the flow guide when the flow guide is disposed in the cavity.

* * * * *